United States Patent
Berger

Patent Number: 5,260,047
Date of Patent: Nov. 9, 1993

[54] PROCESS FOR PURIFYING WASTE GASES CONTAINING POLYHALOGENATED COMPOUNDS

[75] Inventor: Michael Berger, Pullach, Fed. Rep. of Germany

[73] Assignee: Linde Aktiengesellschaft, Wiesbaden, Fed. Rep. of Germany

[21] Appl. No.: 978,068

[22] Filed: Nov. 18, 1992

Related U.S. Application Data

[63] Continuation-in-part of Ser. No. 771,475, Oct. 7, 1991, abandoned.

Foreign Application Priority Data

Oct. 5, 1990 [DE] Fed. Rep. of Germany ....... 4031646

[51] Int. Cl.⁵ .................... B01D 53/34; A62D 3/00; B01J 8/00; B01J 20/34
[52] U.S. Cl. .................... 423/245.1; 423/240 S; 431/5; 502/34; 502/56; 588/251; 95/142
[58] Field of Search .................. 502/5, 34, 56; 55/74; 423/240 R, 245.1, 210, 240.5, 659; 588/251

References Cited

U.S. PATENT DOCUMENTS

| | | | |
|---|---|---|---|
| 3,769,776 | 11/1973 | Berg | 55/74 |
| 4,283,212 | 8/1981 | Graham | 55/74 |
| 4,631,183 | 12/1986 | Lalancette et al. | 423/659 |
| 4,844,875 | 7/1989 | Ettehadieh | 423/210 |
| 4,889,698 | 12/1989 | Moller et al. | 423/210 |
| 5,069,689 | 12/1991 | Goldhaar | 55/74 |

FOREIGN PATENT DOCUMENTS

| | | | |
|---|---|---|---|
| 0252521 | 1/1988 | European Pat. Off. | 502/56 |
| 0284227 | 9/1988 | European Pat. Off. | |
| 3813613 | 11/1989 | Fed. Rep. of Germany | |
| 3827086 | 2/1990 | Fed. Rep. of Germany | |

*Primary Examiner*—Paul E. Konopka
*Attorney, Agent, or Firm*—Millen, White, Zelano & Branigan

[57] ABSTRACT

A process for purifying waste gases containing polyhalogenated compounds, in particular dioxins and furans, which waste gases accumulate, for example, in a garbage incinerator 1, are directed through a filter 3, which contains an adsorption agent, e.g., activated coke. The adsorption agent, loaded with harmful substances, in particular dioxins and furans, is transported under an inert gas to another processing operation or to storage. During this transportation step, the dioxins and furans are decomposed in heating zones 11 and cooling zones 12, with the preferred decomposition temperature being about 250°–450° C.

21 Claims, 1 Drawing Sheet

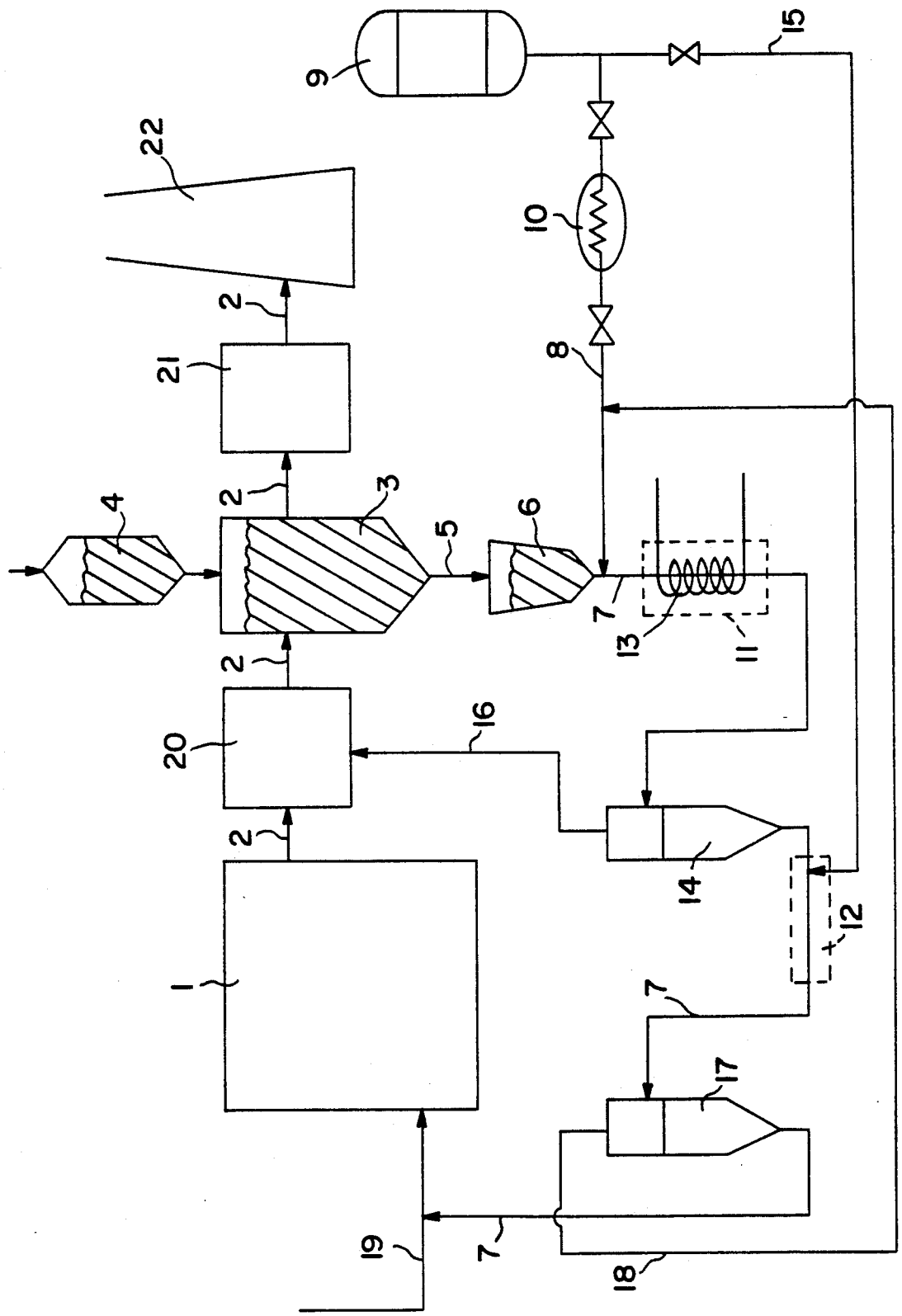

PROCESS FOR PURIFYING WASTE GASES CONTAINING POLYHALOGENATED COMPOUNDS

This application is a continuation-in-part of application Ser. No. 07/771,475, filed Oct. 7, 1991 now abandoned.

BACKGROUND OF THE INVENTION

This invention relates to a process for purifying waste gases containing polyhalogenated compounds, by adsorption, wherein the adsorption agent loaded with harmful substances is transported under an inert gas to another processing step or to storage.

In flue gas purification systems associated with heating and power stations and garbage incinerators, adsorption stages employing activated carbon, activated coke or lime-carbon mixtures are used to remove harmful substances such as, e.g., mercury, dioxins and furans. The activated carbon is, for example, derived conventionally from lignite; activated coke is obtained conventionally, for example, from anthracite coal; and lime-carbon mixtures are commercially obtainable. Other adsorption agents having an affinity for the harmful substances can also be used.

After the adsorption agent is loaded with harmful substances as a result of the flue gas purification, the loaded agent must be stored so it can then be disposed of or transported to another site. Generally, the disposal comprises dumping of the waste.

Whereas this type of flue gas purification by adsorption solves the gaseous emission problem, a new waste and safety problem occurs in the form of highly toxic contaminated adsorption agents. Heretofore, the adsorption agent, e.g., activated carbon or activated coke, was stored in silos and then fed in batch amounts pneumatically, mechanically or by silo trucks for thermal utilization within or outside the installation. For thermal utilization, there were commonly employed furnaces, especially slag tap furnace, but other conventional equipment can also be used. In the case of the lime-carbon adsorption agent, because of the high salt content therein, it has to be fed to a physical-chemical pretreatment to render it inert before dumping. It is also known that for safety reasons storage and transport have to take place under inert gas protection in order to prevent spontaneous combustion of the particulate carbon as well as the emission of desorbable toxic pollutants. But the toxic potential remains, giving rise to additional safety and environmental protection problems.

SUMMARY OF THE INVENTION

An object of the invention is to provide a waste gas purification process of the above-mentioned type wherein the decontamination of the adsorption agent loaded with harmful substances, in particular dioxins and furans, can be achieved in a safe and economical way.

The operating conditions required for the destruction of dioxins and furans on solids are already known and were previously studied in fly ash and in contaminated soils. Here, closed reactors are involved, in which the solid, under oxygen-deficient conditions, is heated in batch quantities or semi-continuously for a sufficient time at 150°-800° C., preferably 250°-450° C. and then quenched. Under these conditions, the primary dioxin decomposition is not followed by dioxin reformation. For further details, reference is directed to the literature by Prof. Hagenmeier of Tuebingen University, as well as EP 0 252 521 A 1.

This invention takes advantage of the realization that when the adsorption agent is transported under inert gas protection, ideal conditions exist for additional dioxin and furan decomposition, provided that heating and cooling zones are placed in the transport path. Oxygen-deficient conditions already exist as a result of the inert condition. Since the adsorption agent during the transportation step has a relatively large surface area and is also mixed, a substantial decomposition of the dioxins and furans is achieved even with relatively short heating and cooling phases, e.g., depending on the type of pollutant, heating times of generally 120 minutes to 5 seconds and preferably 10 minutes to 10 seconds and quench times to lower the temperature to below 30° C. of generally 5 seconds to 60 minutes, and preferably 10 to 60 seconds. For these reasons, it is possible to utilize the relatively low heating temperatures of about 250° up to 450° C. The heating and cooling steps can be conducted by conventional radiation or conduction. For example, infrared radiators can be used, or the transport lines can be indirectly heated or cooled by a heating or cooling medium. According to an especially preferred embodiment of the invention, liquid nitrogen or low-temperature nitrogen gas is sprayed directly into the transport path to cool the adsorption agent rapidly, which involves convection, as well.

As the adsorption agent, preferably activated carbon, activated coke or a lime-carbon mixture is used. With these adsorption agents, harmful gases, such as $SO_2$, HCl, HF, $H_2S$, $NH_3$, basic amines and gaseous heavy metals, in particular mercury, can be selectively removed from the gas. Furthermore, fine powders having harmful substances bound thereto, such as cadmium and lead, are also filtered out from the waste gas to be purified. In particular, dioxins and furans which form, e.g., in waste incinerators are retained especially well by these adsorption agents.

If activated carbon, activated coke or a lime-carbon mixture is used as the adsorption agent, the transport of the adsorption agent can take place mechanically, e.g., by a conveyor. But according to a preferred embodiment of the invention, the adsorption agent is transported pneumatically by nitrogen. In this way, two objectives can be simultaneously attained, namely the transportation and the inert atmosphere. If, moreover, the cooling of the adsorption agent takes place by spraying liquid nitrogen or low-temperature nitrogen gas, the resulting nitrogen gas can also be used simultaneously as the transport medium as well as for providing an inert atmosphere.

According to a further aspect of the invention, the adsorption agent is freed of decomposed dioxins following the heating of the adsorption agent or after the cooling step or after both the heating step and the cooling step, in a solid-gas phase separation system. For example, the adsorption agent can, after the heating zone, be fed, for example, to a cyclone, in which mercury, and various condensates, etc., are separated form the adsorption agent. The separated harmful substances are preferably fed to the flue gas purification system, e.g., wet scrubbers, which also contains conventional suitable liquid waste disposal arrangements for the disposal of liquid substances such as mercury for example.

According to still another aspect of the invention, a portion of the resultant separated and purified adsorption agent may be recycled and admixed with fresh adsorbent. Alternatively, the resultant adsorption agent may be fed in whole or in part to a furnace as fuel.

In summary, the invention can provide a relatively harmless waste or fuel, with a far fewer problems, from a toxically contaminated adsorption agent by the destruction of dioxins and furans in heating and cooling zones interposed in the transport section normally used for transporting loaded adsorption agent to a disposal or storage facility. In this way, the use of treated loaded activated carbon or activated coke filters as fuel for incinerators is made safe to handle.

BRIEF DESCRIPTION OF THE DRAWING

The FIGURE is a schematic flow chart of a comprehensive preferred process for the purification of waste gas from a garbage incinerator, said process employing an integrated activated coke decontamination system according to the invention.

DETAILED DESCRIPTION OF THE DRAWING

A garbage incinerator 1 is supplied with household waste and/or industrial waste by a garbage feed 19. The resultant waste gas is passed by waste gas pipe 2 successively to a conventional flue gas purification system 20, e.g., a gas scrubber, an activated coke filter 3 and a conventional denitrification stage 21, e.g., wherein $NO_x$ is reduced to $N_2$ with $NH_3$ on an activated charcoal filter (a system employed in the incinerator unit Arzberg/Northern Bavaria, activated coke of the Bergbauforschung/Essen, construction of unit by UHDE, licensee of Mitsui Mining Company, Japan). The purified waste gas is finally drawn off through a chimney 22. Lignite coke, which has very good adsorption properties, in particular for the polyhalogenated compounds such as dioxins and furans, is used as the activated coke. Activated coke which is spent, i.e., loaded with harmful substances, is drawn off through pipe 5 and fed to a metering tank 6. Fresh activated coke in feed tank 4 refills activated coke filter 3.

The spent activated coke contains a high concentration of the polyhalogenated compounds, in particular dioxins and furans. After several purification steps, the activated coke is used as fuel in the furnace of garbage incinerator 1. For this purpose, a delivery pipe 7 pneumatically operated by nitrogen gas is used, which nitrogen is supplied by a gas pipe 8. The nitrogen is withdrawn from liquid nitrogen tank 9, and is converted in an evaporator 10 to the gaseous state so as to be able to function as the motive transport gas in the pneumatic delivery pipe 7. The nitrogen gas not only is used as a transport medium for the activated coke, but it also provides the inert gas (oxygen-deficient) atmosphere necessary for the destruction of the dioxins and furans. Furthermore, a possible fire hazard is prevented by virtue of the nitrogen atmosphere A heating zone 11 and a cooling zone 12 are incorporated in delivery pipe 7 to destroy the dioxins and furans adsorbed on the activated coke. To heat the activated coke to temperatures of about 250° up to about 450° C., superheated steam, produced by the flue gas from garbage incinerator 1, is brought in indirect heat exchange with the activated coke in a heat exchanger 13. The hot activated coke is then fed to a cyclone 14, in which the activated coke is freed by solid-gas phase separation of volatile and desorbable substances. The separated harmful substances are drawn off through pipe 16 and fed to flue gas purification 20 of garbage incinerator 1, which comprises suitable disposal systems for these harmful substances.

The hot activated coke is then passed to cooling zone 12, in which the hot activated coke is cooled suddenly, i.e., quenched by a spray of liquid nitrogen taken from liquid gas tank 9 and fed through pipe 15 to cooling zone 12. The additional nitrogen evaporated in cooling zone 12 is then separated, for example, in downstream cyclone 17, and recycled through pipe 18 to gas pipe 8. (In principle, the use of liquid nitrogen for direct heat exchange is known and comprises an injection zone, an expansion space and a separation zone. Routine engineering is utilized for the design of any particular system.) The recycled nitrogen is mixed with the nitrogen gas coming from evaporator 10 and is used as a transport medium for the activated coke transport in delivery pipe 7.

The function of the quench zone 12 in the drawing is to prevent recombination of residual decomposition products incorporated with the activated coke, which would otherwise occur if the coke were allowed to cool slowly. Whereas most of the residual decomposition gases would be adsorbed into the coke, some free decomposition gases mixed with residual nitrogen would be physically trapped in the free spaces between particles of activated coke. Thus, in the downstream cyclone, where nitrogen is separated from the coke, a finite amount of dioxin and furan decomposition products are also separated. Accordingly, the desorbable decomposition products, those which have been adsorbed and those which have been trapped interstitially, are removed after the quench step and recycled to the inert nitrogen stream used as transport gas in conduit 8. There is no build-up of decomposition products inasmuch as the gases withdrawn from cyclone 14 via conduit 16 are removed in flue gas purification system 20 (e.g., a scrubber). Furthermore, the scrubbing of the gases from conduit 16 serves to prevent any recombination of the decomposition products into dioxins and/or furans.

It is possible to quench all of the adsorption agent immediately after the heating step and then pass the resultant quench material into a cyclone for removing the decomposition gases from the adsorption agent, although under such circumstances, there would be more decomposition products adsorbed onto the adsorption agent after the gas removal step than as set forth in the embodiment in the drawing.

As an alternative to the direct spraying of liquid nitrogen onto the activated coke in cooling zone 12, it is also possible to bring the liquid nitrogen in indirect heat exchange with the activated coke. For this purpose, the liquid nitrogen can be introduced, for example, in a hollow wall in delivery pipe 7. The resultant evaporated nitrogen is then withdrawn from the hollow wall and fed to gas pipe 8, to be used as a transport medium for the activated coke. An advantage of the indirect cooling with nitrogen is that the cyclone 17 would be unnecessary.

By virtue of the heating and subsequent cooling of the activated coke under inert gas conditions, the dioxins and furans are destroyed. The mixing involved in the activated coke transport advantageously affects the decomposition reactions. Also, the fact that the activated coke present in the delivery pipe 7 has a large surface area accelerates the rate of decomposition of the dioxins and furans. Therefore, relatively short heating and cooling times are sufficient to achieve a substantial destruction of the dioxins and furans. The activated coke thus treated is finally recycled for firing in garbage incinerator 1.

With respect to metering vessel 6, in particular, it does not constitute a reaction space along the lines of the conventional processes but serves for the controlled release (e.g., by star wheel) of loaded adsorbent according to optimal residence times in the heating and cooling zone. Residence times in the metering vessel compared to those of prior art reaction or buffer vessels are, therefore, relatively very small. Altogether, the total residence times in the flowpath between output filter 3 and output cooling zone 12, inclusive (depending on the pollutant composition and temperature ranges) are generally between 20 seconds and 4 hours and particularly between 1 minute and 20 minutes.

The entire disclosures of all applications, patents and publications, cited above and below, and of corresponding application Federal Republic of Germany P 40 31 646.7, filed Oct. 5, 1990, are hereby incorporated by reference.

The preceding example can be repeated with similar success by substituting the generically or specifically described reactants and/or operating conditions of this invention for those used in the preceding example.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. In a process for purifying waste gases containing polyhalogenated compounds, said process comprising adsorbing the polyhalogenated compounds with an adsorption agent, and transporting resultant adsorption agent loaded with harmful substances under an inert gas to another processing step or to storage, the improvement which comprises that during said transporting the adsorption agent is heated in a heating step to temperatures of about 250° C. up to about 450° C. within 10 seconds to 10 minutes to decompose any dioxins and furans adsorbed on said adsorption agent; the resultant adsorption agent is then cooled in a cooling step to below 30° C. in 10 to 60 seconds; and decomposed dioxins and furans are separated from said adsorption agent after the heating step or after the cooling step or after both the heating step and the cooling step.

2. A process according to claim 1, wherein activated carbon, activated coke or a lime-carbon mixture is used as the adsorption agent.

3. A process according to claim 1, wherein the adsorption agent is transported pneumatically by nitrogen gas.

4. A process according to claim 2, wherein the adsorption agent is transported pneumatically by nitrogen gas.

5. A process according to claim 1, wherein the cooling of the adsorption agent is conducted by spraying liquid nitrogen or low-temperature nitrogen gas directly onto hot adsorption agent in the transport path.

6. A process according to claim 2, wherein the cooling of the adsorption agent is conducted by spraying liquid nitrogen or low-temperature nitrogen gas directly onto hot adsorption agent in the transport path.

7. A process according to claim 3, wherein the cooling of the adsorption agent is conducted by spraying liquid nitrogen or low-temperature nitrogen gas directly onto hot adsorption agent in the transport path.

8. A process according to claim 1, wherein following the heating of the adsorption agent, the adsorption agent is freed of volatile and desorbable substances by a solid-gas phase separation.

9. A process according to claim 1, wherein following both the heating of the adsorption agent and after the cooling of the adsorption agent, the adsorption agent is freed of decomposition products by a solid-gas phase separation.

10. A process according to claim 3, wherein following both the heating of the adsorption agent and before and after the cooling of the adsorption agent, the adsorption agent is freed of decomposition products substances by a solid-gas phase separation.

11. A process according to claim 5, wherein following both the heating of the adsorption agent and after the cooling of the adsorption agent, the adsorption agent is freed of decomposition products substances by a solid-gas phase separation.

12. A process according to claim 7, wherein following both the heating of the adsorption agent and after the cooling of the adsorption agent, the adsorption agent is freed of decomposition products substances by a solid-gas phase separation.

13. A process according to claim 2, wherein after the heating and cooling steps, the resultant adsorption agent is burned.

14. A process according to claim 13, which is conducted continuously.

15. A process according to claim 14, wherein said combustion occurs in an incinerator, and resultant flue gas from the incinerator comprises said waste gases containing polyhalogenated compounds.

16. A process according to claim 15, wherein the cooling of the adsorption agent is conducted by spraying liquid nitrogen or low-temperature nitrogen gas directly onto hot adsorption agent in the transport path.

17. A process according to claim 9, further comprising withdrawing gas freed from the adsorption agent after the cooling step and recycling said gas as said inert gas for transporting said adsorption agent.

18. A process according to claim 10, A process according to claim 13, further comprising withdrawing gas freed from the adsorption agent after the cooling step and recycling said gas as said inert gas for transporting said adsorption agent.

19. A process according to claim 11, A process according to claim 13, further comprising withdrawing gas freed from the adsorption agent after the cooling step and recycling said gas as said inert gas for transporting said adsorption agent.

20. A process according to claim 12, A process according to claim 13, further comprising withdrawing gas freed from the adsorption agent after the cooling step and recycling said gas as said inert gas for transporting said adsorption agent.

21. A process according to claim 1, conducted continuously, wherein said heating is conducted by indirect heat exchange with superheated steam in a heat exchanger incorporated in a zone of a delivery pipe for transporting the adsorption agent.

* * * * *